US008821834B2

(12) United States Patent
Curello et al.

(10) Patent No.: US 8,821,834 B2
(45) Date of Patent: Sep. 2, 2014

(54) HYDROGEN GENERATOR WITH AEROGEL CATALYST

(75) Inventors: Michael Curello, Cheshire, CT (US); Constance Stepan, Oxford, CT (US)

(73) Assignee: Societe BIC, Clichy Cedex (FR)

( * ) Notice: Subject to any disclaimer, the term of this patent is extended or adjusted under 35 U.S.C. 154(b) by 0 days.

(21) Appl. No.: 13/132,827

(22) PCT Filed: Dec. 22, 2009

(86) PCT No.: PCT/US2009/069239
§ 371 (c)(1),
(2), (4) Date: Jun. 3, 2011

(87) PCT Pub. No.: WO2010/075410
PCT Pub. Date: Jul. 1, 2010

(65) Prior Publication Data
US 2011/0243836 A1   Oct. 6, 2011

Related U.S. Application Data

(60) Provisional application No. 61/140,313, filed on Dec. 23, 2008.

(51) Int. Cl.
C01B 3/08 (2006.01)
H01M 8/06 (2006.01)

(52) U.S. Cl.
CPC .............. H01M 8/065 (2013.01); Y02E 60/362 (2013.01); Y02E 60/50 (2013.01)
USPC ........................................................ 423/657

(58) Field of Classification Search
None
See application file for complete search history.

(56) References Cited

U.S. PATENT DOCUMENTS

| 3,133,837 A | 5/1964 | Eidensohn |
| 3,787,186 A | 1/1974 | Geres |

(Continued)

FOREIGN PATENT DOCUMENTS

| CN | 1572472 A | 1/2005 |
| CN | 101041416 A | 9/2007 |

(Continued)

OTHER PUBLICATIONS

Machine translation of JP 2004161554.*

(Continued)

*Primary Examiner* — Melvin C Mayes
*Assistant Examiner* — Kenneth Vaden
(74) *Attorney, Agent, or Firm* — The H.T. Than Law Group

(57) ABSTRACT

The present invention concerns a hydrogen gas-generating apparatus (10) comprising (1) a reservoir (100) comprising an aqueous component (110), (2) a fuel compartment (200) comprising a solid metal borohydride fuel component (210), and (3) a reaction chamber (300) comprising an aerogel catalyst (310). A first fluid path introduces the aqueous component into the fuel compartment where the solid metal borohydride fuel component is dissolved into a liquid metal borohydride fuel component (210'). A second fluid path introduces the liquid metal borohydride fuel component into the reaction chamber to produce a hydrogen gas by means of a hydride-water oxidation reaction that is accelerated by the aerogel catalyst. The temperature and/or pressure of the reaction chamber are predetermined to maintain the water in the borate byproduct to be substantially in the liquid phase to minimize the precipitation of the borate byproduct.

17 Claims, 5 Drawing Sheets

(56) References Cited

U.S. PATENT DOCUMENTS

| | | | |
|---|---|---|---|
| 3,917,461 A | 11/1975 | Kuhl et al. | |
| 3,932,138 A | 1/1976 | Louis | |
| 4,054,423 A | 10/1977 | Blenman | |
| 4,064,226 A | 12/1977 | Becker et al. | |
| 4,072,514 A | 2/1978 | Suzuki | |
| 4,650,660 A | 3/1987 | Harris | |
| 5,202,195 A | 4/1993 | Stedman et al. | |
| 5,244,640 A | 9/1993 | Crawford | |
| 5,648,052 A | 7/1997 | Schaefer et al. | |
| 6,010,798 A | 1/2000 | Hammerschmidt et al. | |
| 6,274,093 B1 | 8/2001 | Long | |
| 6,322,723 B1 | 11/2001 | Thomas | |
| 6,506,360 B1 | 1/2003 | Andersen et al. | |
| 6,582,676 B2 | 6/2003 | Chaklader | |
| 6,686,079 B2 | 2/2004 | Zhang et al. | |
| 6,746,496 B1 | 6/2004 | Kravitz et al. | |
| 7,105,033 B2 | 9/2006 | Strizki et al. | |
| 7,198,761 B2 | 4/2007 | Buelow et al. | |
| 7,666,386 B2 | 2/2010 | Withers-Kirby et al. | |
| 7,674,540 B2 | 3/2010 | Adams et al. | |
| 7,695,709 B2 | 4/2010 | Takeshi et al. | |
| 2004/0033194 A1* | 2/2004 | Amendola et al. | 423/658.2 |
| 2004/0047801 A1 | 3/2004 | Petillo et al. | |
| 2004/0148857 A1 | 8/2004 | Strizki et al. | |
| 2006/0225350 A1 | 10/2006 | Spallone et al. | |
| 2007/0004582 A1 | 1/2007 | Lim et al. | |
| 2007/0084879 A1 | 4/2007 | McLean et al. | |
| 2007/0271844 A1 | 11/2007 | Mohring et al. | |
| 2008/0032166 A1 | 2/2008 | Amendola et al. | |
| 2008/0160360 A1 | 7/2008 | Fennimore et al. | |
| 2009/0020174 A1 | 1/2009 | Fennimore et al. | |

FOREIGN PATENT DOCUMENTS

| | | | |
|---|---|---|---|
| JP | 2566248 A | | 3/1989 |
| JP | H05-007781 | | 1/1993 |
| JP | H11-079705 | | 3/1999 |
| JP | 200131401 A | | 8/2002 |
| JP | 2003221201 A | | 8/2003 |
| JP | 2003221202 A | | 8/2003 |
| JP | 2004161554 A | * | 6/2004 |
| JP | 2004231466 A | | 8/2004 |
| JP | 2007326742 A | | 12/2007 |

OTHER PUBLICATIONS

International Search Report and Written Opinion issued in connection with the corresponding International Application No. PCT/US2009/069239 on May 4, 2010.
Machine translation of JP 2003221201 to Mitsuya et al.
Machine translation of JP 2003221202 to Mitsuya et al.
Machine translation of JP 2007326742 to Takeshi et al.
Translated Abstract of JP 2566248 to Kenji.
Machine translation of JP 2004231466 to Ilzuka Kazuyuki.
Machine translation of JP 2001031401 to Hiromichi.
Oxidation of Silicon by Water. K. European Ceramic Society. 5 1989, 219-222.
Silicon as an Intermediary.
Translated Abstract of CN 1572472.
Translated Abstract of CN 101041416.

* cited by examiner

HYDROGEN GENERATOR WITH AEROGEL CATALYST

CROSS-REFERENCE TO RELATED APPLICATIONS

The present application is a U.S. national phase under 35 USC §371 of, and claims priority to international patent application PCT/US2009/069239, filed on Dec. 22, 2009, which claims priority to U.S. provisional patent application No. 61/140,313, filed on Dec. 23, 2008. These applications are incorporated herein by reference in their entireties.

FIELD OF THE INVENTION

The present invention generally relates to methods and systems for generating hydrogen for fuel cells. More particularly, the present invention relates to hydrogen-generating apparatuses comprising an organic aerogel coated with a fine dispersion of catalyst, which accelerates exothermic hydride-water oxidation reactions that release hydrogen. The present invention also relates to a reaction chamber that can sustain the reaction until substantially all the reactants are consumed.

BACKGROUND OF THE INVENTION

Fuel cells are devices that directly convert chemical energy of reactants, i.e., fuel and oxidant, into direct current (DC) electricity. For a number of applications, fuel cells can be more efficient than conventional power generation, such as combustion of fossil fuel, as well as portable power storage, such as lithium-ion batteries.

In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel; (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel; (iii) PEM fuel cells that can consume non-hydrogen fuel directly or direct oxidation fuel cells; and (iv) solid oxide fuel cells (SOFC) that directly convert hydrocarbon fuels to electricity at high temperature.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, has promising power application for consumer electronic devices. SOFC convert hydrocarbon fuels, such as butane, at high heat to produce electricity. SOFC requires relatively high temperatures in the range of 1000° C. for the fuel cell reaction to occur.

Another type of liquid fuel is hydrazine, which can be anhydrous or in its monohydrate form. Hydrazine is soluble in water and decomposes to form hydrogen in the presence of water, as follows:

$$N_2H_4H_2O+H_2O \rightarrow 2H_2+N_2+2H_2O$$

The chemical reactions that produce electricity are different for each type of fuel cell. For DMFC, the chemical-electrical reaction at each electrode and the overall reaction for a direct methanol fuel cell are described as follows:

Half-reaction at the anode:

$$CH_3OH+H_2O \rightarrow CO_2+6H^++6e^-$$

Half-reaction at the cathode:

$$1.5O_2+6H^++6e^- \rightarrow 3H_2O$$

The overall fuel cell reaction:

$$CH_3OH+1.5O_2 \rightarrow CO_2+2H_2O$$

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated by reference herein in their entireties. Generally, the PEM is made from a polymer, such as Nafion® available from DuPont, which is a perfluorinated sulfonic acid polymer having a thickness in the range of about 0.05 mm to about 0.50 mm, or other suitable membrane. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

In another direct oxidation fuel cell, borohydride fuel cell (DBFC) reacts as follows:

Half-reaction at the anode:

$$BH_4^-+8OH^- \rightarrow BO_2^-+6H_2O+8e^-$$

Half-reaction at the cathode:

$$2O_2+4H_2O+8e^- \rightarrow 8OH^-$$

Chemical metal hydride fuels are promising due to their relatively higher energy density, i.e., amount of hydrogen per mass or volume of fuel. In a chemical metal hydride fuel cell, sodium borohydride is reformed and reacts as follows:

$$NaBH_4+2H_2O \rightarrow (\text{heat or catalyst}) \rightarrow 4(H_2)+(NaBO_2)$$

Half-reaction at the anode:

$$H_2 \rightarrow 2H^++2e^-$$

Half-reaction at the cathode:

$$2(2H^++2e^-)+O_2 \rightarrow 2H_2O$$

Suitable catalysts for this reaction include platinum, ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated by reference herein in its entirety.

One disadvantage of the known hydrogen gas generators is that the borohydride-water oxidation reaction, mentioned above, generates undesirable borate byproducts that limit the release of hydrogen from borohydride. Accordingly, there is a desire to obtain a hydrogen gas generator apparatus that is capable of maximizing the release of hydrogen from chemical metal hydride fuels.

SUMMARY OF THE INVENTION

The present invention concerns a hydrogen gas-generating apparatus comprising a reservoir comprising an aqueous component, such as water or methanol and additives, a fuel compartment comprising a solid fuel component, such as a metal hydride and additives, and a reaction chamber comprising a catalyst dispersed on an aerogel platform. A first fluid path introduces the aqueous component, which is preferably pressurized, into the fuel compartment where the solid fuel component is dissolved to form an aqueous fuel mixture. A second fluid path introduces the aqueous fuel mixture into the reaction chamber to produce a gas such as hydrogen by an oxidation reaction that is accelerated by the aerogel catalyst.

In a preferred embodiment, the aerogel catalyst is positioned within a reaction chamber, which collects both the hydrogen gas and byproducts. The reaction chamber, which preferably includes a flexible container, contains a sufficient amount of water to maintain the byproducts in an aqueous state, and thereby prevent the formation of precipitates that may clog the pores on the aerogel catalyst.

The reaction chamber is preferably maintained at a certain temperature and/or pressure to minimize the probability of developing excessive evaporation of water and the potential for precipitation of the byproducts.

BRIEF DESCRIPTION OF THE DRAWINGS

In the accompanying drawings, which form a part of the specification, and are to be read in conjunction therewith and in which like reference numerals are used to indicate like parts in the various views.

DETAILED DESCRIPTION OF THE INVENTION

Figure 1:
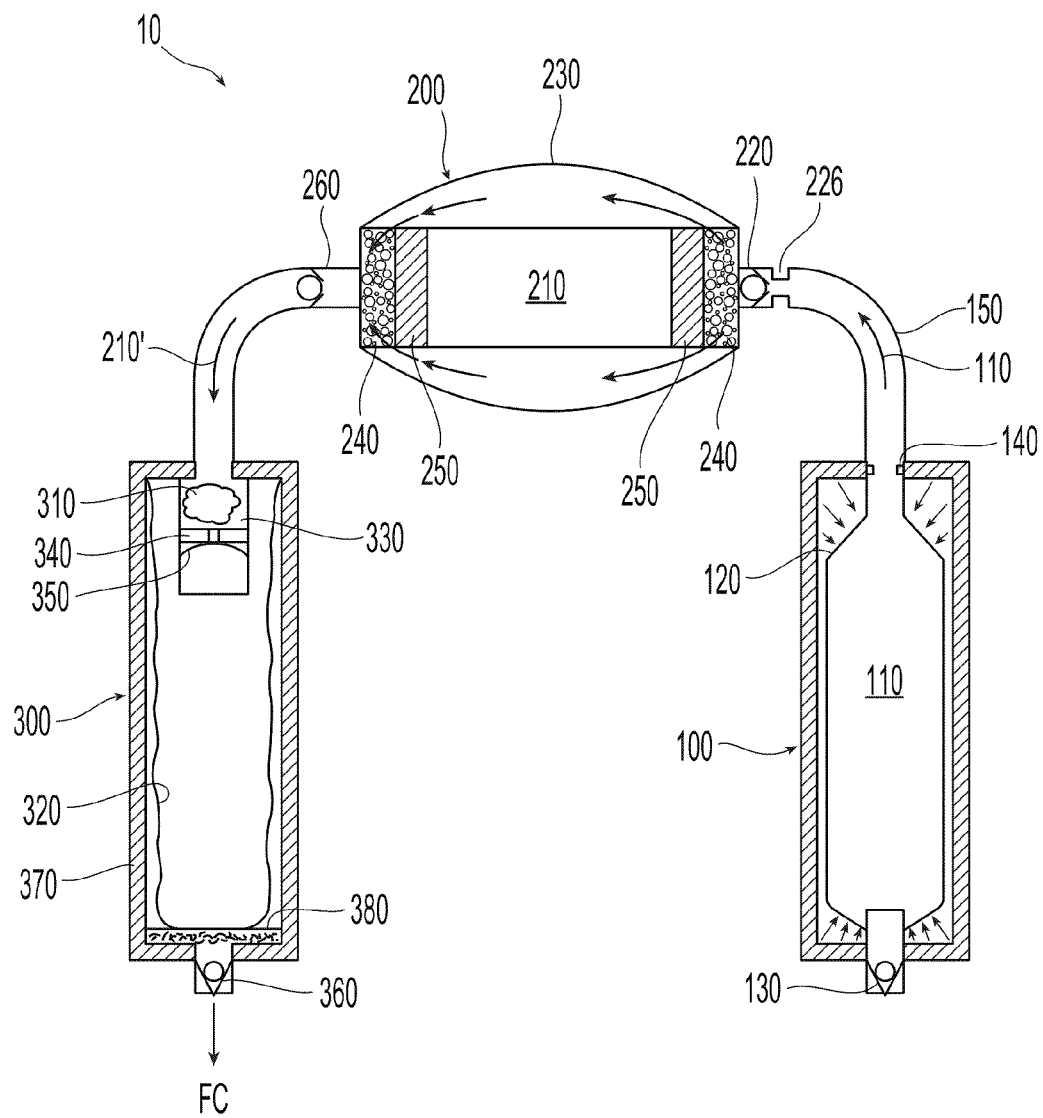
FIG. 1 is a cross-sectional schematic view of a gas-generating apparatus according to the present invention.

As illustrated in the accompanying drawings and discussed in detail below, the present invention is directed to a fuel supply, which stores fuel cell fuels. Methanol and other alcohols are usable in many types of fuel cells, e.g., DMFC, enzyme fuel cells and reformat fuel cells, among others. The fuel supply may contain other types of fuel cell fuels, such as ethanol or alcohols; metal hydrides, such as sodium borohydrides; other chemicals that can be reformatted into hydrogen; or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in U.S. Pat. App. Pub. No. US 2003/0077493, entitled "Method of Using Fuel Cell System Configured to Provide Power to One or More Loads," published on Apr. 24, 2003, which is incorporated by reference herein in its entirety. Fuels can also include a mixture of methanol, hydrogen peroxide and sulfuric acid, which flows past a catalyst formed on silicon chips to create a fuel cell reaction. Moreover, fuels include a blend or mixture of methanol, sodium borohydride, an electrolyte, and other compounds, such as those described in U.S. Pat. Nos. 6,554,877, 6,562,497 and 6,758,871, which are incorporated by reference herein in their entireties. Furthermore, fuels include those compositions that are partially dissolved in a solvent and partially suspended in a solvent, described in U.S. Pat. No. 6,773,470 and those compositions that include both liquid fuel and solid fuels, described in U.S. Pat. Appl. Pub. No. US 2002/0076602. Suitable fuels are also disclosed in co-owned, international publication No. WO 2006/135,895, entitled "Fuels for Hydrogen-Generating Cartridges," published on Dec. 21, 2006. These references are also incorporated by reference herein in their entireties.

Fuels can further include hydrocarbon fuels, which include, but are not limited to, butane, kerosene, alcohol, and natural gas, as set forth in U.S. Pat. Appl. Pub. No. US 2003/0096150, entitled "Liquid Hereto-Interface Fuel Cell Device," published on May 22, 2003, which is incorporated by reference herein in its entirety. Fuels can also include liquid oxidants that react with fuels. The present invention is therefore not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gaseous, liquids, solids, and/or chemicals including additives and catalysts and mixtures thereof. Preferred fuels include a metal hydride such as sodium borohydride ($NaBH_4$) and water, discussed above.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications can include, but are not limited to, storing hydrocarbons and hydrogen fuels for micro gas-turbine engines built on silicon chips, discussed in "Here Come the Microengines," published in The Industrial Physicist (December 2001/January 2002) at pp. 20-25. As used in the present application, the term "fuel cell" can also include microengines. Other applications can include storing traditional fuels for internal combustion engines and hydrocarbons, such as butane for pocket and utility lighters and liquid propane.

Suitable known hydrogen-generating apparatus are disclosed in commonly-owned, U.S. Pat. No. 7,329,470, U.S. Pat. Appl. Pub. No. US 2005-0074643 A1, U.S. Pat. Appl. Pub. No. 2006-0174952 A1, U.S. Pat. Appl. Pub. No. 2006-0191198 A1, and international publication No. WO 2006/135,895. The disclosures of these references are incorporated by reference herein in their entireties.

The present invention concerns a hydrogen-generating apparatus comprising an aerogel catalyst, which accelerates exothermic borohydride-water oxidation reactions that release hydrogen gas, including, but not limited to, the following reaction (1):

$$X(BH_4)_y + 2H_2O \rightarrow X(BO_2) + 4H_2 \qquad (1)$$

where X includes, but is not limited to, any Group IA or Group IIA metals such as Na, Mg, Li, K, or the like, or a combination thereof, and where y is a number that represents the valence of X. As depicted in FIG. 1, and discussed in greater detail below, the present invention includes several other structural innovations, which are designed to maximize the generation of hydrogen gas and minimize flow resistance.

As used herein, the term "aerogel" refers to a highly porous material of low density, which is prepared by forming a gel and then removing liquid from the gel while substantially retaining the gel structure. Generally, an aerogel is a structure wherein gas is dispersed in an amorphous solid composed of interconnected particles that form small, interconnected pores. Specifically, and as used herein, an aerogel is a structure in which: (1) the average pore diameter is between about 2 nm and about 50 nm, which is determined from the multipoint BJH (Barrett, Joyner and Halenda) adsorption curve of $N_2$ over a range of relative pressures, typically 0.01-0.99 ("the BJH method" measures the average pore diameter of those pores having diameters between 1-300 nm and does not account for larger pores); and (2) at least 50% of its total pore volume comprises pores having a pore diameter of between 1-300 nm. Further discussion of aerogels can be found in U.S. Pat. No. 7,005,181, which is incorporated herein by reference in its entirety.

A variety of different aerogel compositions are known including, but not limited to, inorganic, organic or organic-inorganic hybrids. Inorganic aerogels can be based upon metal alkoxides such as silica [S. S. Kistler, *Nature*, 1931, 127, 764 and S. S. Kistler, U.S. Pat. No. 2,093,454], alumina [S. J. Teichner et al., *Adv. Colloid Interface Sci.* 1976, 5, 245], and various carbides [C. I. Merzbacher et al., *J. Non-Cryst. Solid*, 2000, 285, 210-215]. Organic aerogels include, but are not limited to, urethane aerogels [G. Biesmans et al., 1998, 225, 36], resorcinol formaldehyde aerogels [R. W. Pekala, U.S. Pat. No. 4,873,218], phenolic aerogels [D. Albert et al., U.S. Pat. No. 7,005,181], and polyimide aerogels [W. Rhine et al., U.S. Pat. No. 7,074,880].

Aerogels are commercially available from several sources including Cabot Corp. (Billerica, Mass.), Aspen Aerogel, Inc. (Northborough, Mass.), Hoechst, A.G. (Germany), and American Aerogel Corp. (Rochester, N.Y.).

In a preferred embodiment, the present invention utilizes organic aerogels (e.g., phenolic aerogels) such as those described in the '181 patent to Albert et al. and such as those commercially available as AEROBLACK® from American Aerogel Corp. More particularly, the preferred organic aerogels are prepared according to a two-step polymerization process described in the '181 patent. The first step comprises reacting an hydroxylated aromatic or a polymer resin comprising an hydroxylated aromatic (e.g., phenolic resin, preferably a phenolic-novolak resin such as GP-2018c, commercially available from Georgia-Pacific Resins, Inc. of Decatur, Ga.) with at least one electrophilic linking agent (e.g., alcohol such as methanol) in a solvent. The solvent comprises at least one compound, which is a liquid that dissolves the organic precursor, precipitates the cross-linked product, and serves to strengthen the solid network during the second step (i.e., drying). Mechanisms for this strengthening interaction may include strong hydrogen bonding and/or covalent modifications that stiffen the polymer backbone so as to minimize (and preferably prevent) cracking and shrinking during drying.

The reaction may take place in the presence of a catalyst (e.g., mineral acids such as hydrobromic acid) that promotes polymerization and/or cross-linking.

The second step, involves drying to remove the liquid components. Unlike other processes known in the art, the drying step does not require supercritical extraction and/or does not cause substantial degradation. Supercritical extraction methods optionally may be used alone or in combination with other drying methods.

The aforementioned two-step polymerization process yields an aerogel that can be used as a catalyst support or platform, because it exhibits optimal surface properties such as high porosity and surface area values. Generally, the catalytic potential of the aerogel is proportionally related to the aerogel's open cell structure and surface area. Thus, the aerogel used in this invention comprises an open cell structure in which greater than about 80% of the cells or pores are open, preferably greater than about 90% of the cells or pores are open, and more preferably substantially about 100% of the cells or pores are open. Similarly, the aerogel used in this invention comprises a surface area greater than about 100 $m^2/g$, preferably greater than about 250 $m^2/g$, more preferably greater than about 500 $m^2/g$, and even more preferably greater than about 1000 $m^2/g$.

Because the aerogel used in the present invention has such high porosity and surface area, there are vast multitudes of sites or pores where catalysts can be deposited, for example by mechanical trapping and/or chemical bonds, to facilitate borohydride-water oxidation reactions. The catalysts can generically be defined by the following formula:

$$M_a X_b$$

wherein M is a transition or rare earth metal, X is a moiety bound covalently, ionically, or through hydrogen-bonding to the metal, and "a" and "b" are integers from 1 to 6 as needed to balance the valence of M.

Suitable transitional metal cations can include, but are not limited to, iron (II) ($Fe^{2+}$), iron (III) ($Fe^{3+}$), cobalt ($Co^{2+}$), nickel (II) ($Ni^{2+}$), nickel (III) ($Ni^{3+}$), ruthenium (III) ($Ru^{3+}$), ruthenium (IV) ($Ru^{4+}$), ruthenium (V) ($Ru^{5+}$), ruthenium (VI) ($Ru^{6+}$), ruthenium (VIII) ($Ru^{8+}$), rhodium (III) ($Rh^{3+}$) rhodium (IV) ($Rh^{4+}$) rhodium (VI) ($Rh^{6+}$), palladium ($Pd^{2+}$), osmium (III) ($Os^{3+}$), osmium (IV) ($Os^{4+}$), osmium (V) ($Os^{5+}$), osmium (VI) ($Os^{6+}$), osmium (VIII) ($Os^{8+}$), iridium (III) ($Ir^{3+}$), iridium (IV) ($Ir^{4+}$), iridium (VI) ($Ir^{6+}$), platinum (II) ($Pt^{2+}$), platinum (III) ($Pt^{3+}$), platinum (IV) ($Pt^{4+}$), platinum (VI) ($Pt^{6+}$), copper (I) ($Cu^+$), copper (II) ($Cu^{2+}$), silver (I) ($Ag^+$), silver (II) ($Ag^{2+}$), gold (I) ($Au^+$), gold (III) ($Au^{3+}$), zinc ($Zn^{2+}$), cadmium ($Cd^{2+}$), mercury (I) ($Hg^+$), mercury (II) ($Hg^{2+}$), tantalum (Ta), and the like.

Suitable X moieties can include, but are not limited to, hydride ($H^-$), fluoride ($F^-$), chloride ($Cl^-$), bromide ($Br^-$), iodide (r), oxide ($O^{2-}$), sulfide ($S^{2-}$), nitride ($N^{3-}$), phosphide ($P^{4-}$), hypochlorite ($ClO^-$), chlorite ($ClO_2^-$), chlorate ($ClO_3^-$), perchlorate ($ClO_4^-$), sulfite ($SO_3^{2-}$), hydrogen sulfite ($HSO_3^-$), sulfate ($SO_4^{2-}$), hydrogen sulfate ($HSO_4^-$), hydroxide ($OH^-$), cyanide ($CN^-$), thiocyanate ($SCN^-$), cyanate ($OCN^-$), peroxide ($O_2^{2-}$), hydroperoxide ($HOO^-$), manganate ($MnO_4^{2-}$), permanganate ($MnO_4^-$), chromate ($CrO_4^{2-}$), dichromate ($Cr_2O_7^{2-}$), carbonate ($CO_3^{2-}$), hydrogen carbonate ($HCO_3^-$), phosphate ($PO_4^{2-}$), hydrogen phosphate ($HPO_4^-$), dihydrogen phosphate ($H_2PO_4^-$), phosphite ($PO_3^{2-}$), hydrogen phosphite ($HPO_3^-$), hypophosphite ($PO_2^-$), aluminate ($Al_2O_4^{2-}$), arsenate ($AsO_4^{3-}$), nitrate ($NO_3^-$), nitrite ($NO_2^-$), acetate ($CH_3COO^-$), oxalate ($C_2O_4^{2-}$), alkoxide ($CH_3(CH_2)_nO^-$, where n is a whole number from 0 to about 19), and the like.

As used herein the term "aerogel catalyst" refers to the combination of an aerogel and one or more catalysts. In a preferred embodiment, an aerogel catalyst is formed by depositing catalysts, preferably acid catalysts such as $CoCl_2$ and $RuCl_3$, onto a suitable aerogel. In one example, 0.25 g $CoCl_2$, 0.15 g $RuCl_3$, and 10 ml water or similar portions thereof are mixed to form a catalytic solution. A 0.5 gram aerogel substrate is heated and then saturated with a fine dispersion of the catalytic solution. Subsequently, the saturated aerogel is dried under vacuum for about 2-4 hours at about 140-160° C.

As illustrated in FIG. 1, in a preferred embodiment, the hydrogen- or gas-generating apparatus 10 comprises at least three compartments: a reservoir 100 for storing an aqueous component 110, a dissolver 200 for housing a solid chemical metal hydride fuel component 210, and a reaction chamber 300 for housing an aerogel catalyst 310 and hosting the reaction to produce a gas, e.g., hydrogen. In accordance with the present invention, reaction chamber 300 is located away from where the solid fuel is mixed with the aqueous fuel. In one embodiment, reaction chamber 300 is positioned within the same chamber as the byproducts. More specifically, reaction chamber 300 is stored within a liner 320. As discussed in greater detail below, aqueous component 110, comprising predominately water, a stabilizer such as NaOH, and other optional additives, flows into dissolver 200 where it dissolves solid metal hydride fuel 210 into an aqueous metal hydride fuel mixture 210'. The aqueous metal hydride fuel mixture 210' then flows into reaction chamber 300 where it undergoes an exothermic reaction, such as according to equation (1), on the open cells or pores of aerogel catalyst 310.

The aerogel catalyst 310 is preferably placed within a housing 330, which is placed inside liner 320. The housing 330 further comprises a flow restrictor to maximize the time that aqueous metal hydride fuel mixture 210' has to react in the presence of aerogel catalyst 310. In one embodiment, the flow restrictor comprises a retainer 340 with an umbrella valve 350. The umbrella valve 350 advantageously slows down the flow of liquid in order to give aqueous metal hydride fuel mixture 210' more time to react at the aerogel catalyst 310. An exemplary umbrella valve is discussed in U.S. patent application Ser. No. 11/917,238 filed on Dec. 12, 2007 (published as WO 2006/135,896), and depicted therein at FIG. 14, reference numeral 981. The disclosure of the '238 application is incorporated herein by reference in its entirety.

The aerogel catalyst 310 accelerates oxidation of the aqueous metal hydride fuel mixture 210'. As noted in the reaction expressed by equation (1), the exothermic borohydride-water oxidation reaction generates both hydrogen gas and undesirable borate byproducts, including metaborate ($BO_2^-$) and other forms of borates. As the oxidation reaction continues, the borate byproducts may have a tendency to precipitate and form a skin or shell on the surface of the aerogel catalyst 310, thereby clogging the multiple open pore sites thereon and inhibiting borohydride-water oxidation reactions. Furthermore, metaborate and other borate ions can form a bond with several molecules of water each, reacting with some and chelating with others, which causes the metal hydride oxidation reaction to need more water than the ideal stoichiometric reaction. Also, it is believed that the water should pass through the borate skin and not be chelated by, or reacted with, the borate oxidation byproducts before reaching the aerogel catalyst beneath. Even though metaborate and other borate ions are less reactive with water than the borohydride molecules, the borate skin cause the borate-water reaction/chelation step to be rate limiting. Further discussion of the undesirability of borate byproducts can be found in U.S. patent application Ser. No. 12/089,018, filed on Apr. 2, 2008 (published as WO 2007/041,403), which is incorporated herein by reference in its entirety.

Accordingly, it is preferable to avoid the precipitation of borate and the formation of a borate skin. In a preferred embodiment, aerogel catalyst 310, contained in housing 330, is positioned within liner 320 where the byproducts are collected. Such a structure allows the hydrogen gas and borate byproducts to readily flow out of the catalyst housing 330 into liner 320, where borate byproducts remained dissolved in aqueous medium. In another structural embodiment (not shown), the aerogel catalyst 310 and its housing 330 are positioned outside of liner 320.

In accordance with one aspect of the present invention, the aqueous medium in liner 320, which contains the borate byproducts, is preferably maintained at a certain temperature and pressure, preferably about 45° C. or less and above about 1.5 psi, as discussed in detail below. If the temperature increases above this level, for example by the exothermic reaction (1), then the water in liner 320 would gradually evaporate, thereby leading to the undesirable precipitation of borate byproducts and clogging of the multitude of aerogel pores. One of ordinary skill in the art will readily appreciate that at higher pressures, the water can be maintained at higher temperatures. The thermodynamics and thermal/mass balance are discussed in detail below.

Referring back to FIG. 1, the flow of liquid from reservoir 100 to reaction chamber 300 will now be discussed. Reservoir 100 preferably comprises a liner, bladder or similar fluid container 120 that stores the aqueous component 110, as shown. The aqueous component 110 is a solution comprising predominantly water, a stabilizing agent, which prevents the premature hydrolysis of the metal hydride fuel component 210, and other optional additives. Exemplary stabilizing agents can include, but are not limited to, metals and metal hydroxides, such as alkali metal hydroxides, e.g., KOH and/or NaOH. Examples of such stabilizers are described in U.S. Pat. No. 6,683,025, which is incorporated by reference herein in its entirety.

Preferably in one embodiment, the aqueous component 110 comprises a 35 mL aqueous solution, wherein the stabilizing agent is NaOH, and wherein the NaOH has a concentration of about 0.1%-30% vol, more preferably 0.3%-20% vol, most preferably 0.5%-10% vol. The aqueous component 110 is initially transported or pumped into fluid container 120 by a fill valve 130, which can be any suitable valve including, but not limited to, ball valves, needle valves, three-way and four-way valves, gate valves, butterfly valves, rotary valves and check valves.

Fluid container 120 is comprised of any deformable material. Preferably, fluid container 120 is made from a deformable, elastomeric material known in the art, such as rubber, urethane, or silicone. In a preferred embodiment, fluid container 120 is an elastomeric silicone that is pressurized, such as by springs or by pressurized gas or liquefied hydrocarbon (e.g., butane, propane, iso-propane), although it may also be unpressurized. When liquefied hydrocarbon is used, it is injected into reservoir 100 and is contained in the space between fluid container 120 and reservoir 100.

Reservoir 100 and dissolver 200 are fluidly connected by a fluid transfer conduit 150. An inlet fluid transfer valve 220, disposed at one end of dissolver 200, controls the flow of aqueous component 110 via conduit 150 into dissolver 200. Optionally, a shut-off valve 140, disposed on the top of fluid container 120, can be pinched by a user to manually turn on or off flow via conduit 150. An outlet fluid transfer valve 260 is disposed at the opposite end of dissolver 200.

As shown in FIG. 1, inlet fluid transfer valve 220 can be any type of pressure-responsive, one-way valve known in the art, including, but not limited to, a check valve, a solenoid valve, a duckbill valve, or preferably, a valve having a pressure responsive diaphragm, which opens or closes when a threshold pressure is reached. In a preferred embodiment, fluid transfer valve 220 is a diaphragm valve, such as the one shown in FIG. 2 and discussed below. Fluid transfer valve 220 is sized so that at or above a predetermined pressure within dissolver 200, valve 220 shuts off. A flow restrictor 226 can be included to slow down the flow of aqueous component 110 to maximize resident time within dissolver 200. Flow resistor 226 can be any device that slows down the flow of aqueous component 110, such as the ones shown in FIGS. 2 and 3, and discussed below.

Dissolver 200 also comprises a solid metal hydride fuel component 210 that is sealingly surrounded by deformable bladder 230. Bladder 230 may be made of any type of material capable of expanding and contracting without the application of external forces. For example bladder 230 may be a balloon-like structure made from an elastomer such as rubber or latex. Alternatively, expandable bladder 230 may be made from a plastic material that may be heat set to return to its original configuration when emptied, such as polyethylene terephthalate (PET).

Storage of the hydrogen-bearing metal hydride fuel in solid form is preferred over the aqueous form. In general, solid hydride fuels are thought to be more advantageous than aqueous hydride fuels because the aqueous fuels contain proportionally less energy than the solid fuels. However, premixed aqueous hydride fuel can also be used to supply fuel to the reaction chamber. In a preferred embodiment, solid metal hydride fuel component 210 is a cylindrical pill or tablet. However, granules, grains, or other forms of solid material are also appropriate. The solid metal hydride fuel component 210 has a solid or impermeable plug 250 (e.g., a silicone plug) positioned on each end, and, thus, solid metal hydride fuel component 210 dissolves into aqueous component 210' along its lateral surface area not at the ends. One porous screen 240 is located between impermeable plug 250 and inlet valve 220, thereby allowing aqueous component 110 to enter dissolver 200, as shown in FIG. 1. An outlet fluid transfer valve 260 is located at the exit end of dissolver 200, and a second porous screen 240 is similarly located between outlet valve 260 and second impermeable plug 250 to allow the dissolved aqueous metal hydride fuel mixture 210' to exit dissolver 200. Outlet valve 260 is sized so that if the pressure within reaction chamber is higher than a predetermined amount, outlet valve 260 closes to halt the flow of aqueous metal hydride fuel mixture to reaction chamber 300 to slow down or stop the reaction to produce hydrogen. Outlet valve 260 also tends to slow down the flow through dissolver 200 to promote mixing between aqueous component 110 and solid fuel 210.

Initially, or during start-up, a user opens shut-off valve 140 on reservoir 100. Pressurized aqueous component 110 flows out or is pumped out through shut-off valve 140 and conduit 150. The pressure of aqueous component 110 opens inlet valve 220 allowing aqueous component 110 to enter bladder 230 through first porous screen 240. Flow restrictor 226 slows the flow of aqueous component 110 through dissolver 200 to increase contact time between aqueous component 110 and solid metal hydride fuel component 210. Flow restrictor 226 can be any device that restricts flow and exemplary embodiments thereof are described below, and flow restrictor 226 can also be positioned at the outlet end of dissolver 200 proximate to outlet valve 260.

Pressurized aqueous component 110 inflates bladder 230, and aqueous component 110 contacts and dissolves solid metal hydride 210 along its outer or lateral surface to form aqueous metal hydride fuel mixture 210', which flows out of second porous screen 240 and outlet valve 260 and into reaction chamber 300.

Figure 2:
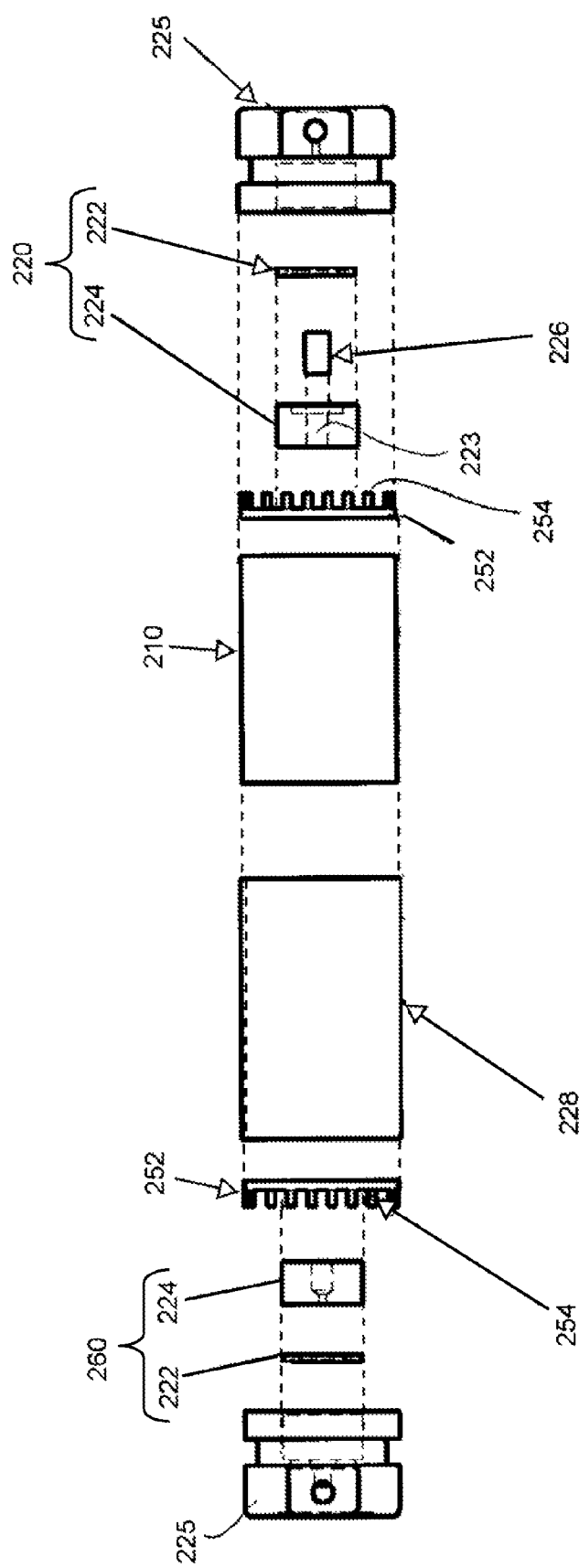
FIG. 2 is an exploded view of an inventive dissolver.

To ensure that solid metal hydride fuel 210 is dissolved uniformly on its lateral or outer surface and to ensure that local cavity(-ies) do not form on the outer surface of solid metal hydride fuel 210, as best shown in the exploded view of FIG. 2, a porous screen 228 is provided to fit around solid fuel 210 to moderate the flow of aqueous fuel 110 around solid fuel 210. Porous screen 228 can be a mesh made from a metal, plastic or composite, or it can be made from paper. Preferably, screen 228 is also placed around the two impermeable plugs 250, shown in FIG. 1, to prevent bladder 230 from forming a seal with plugs 250. Bladder 230 is elastomeric and follows the shape of solid fuel 210 as it is dissolved by aqueous fuel 110.

Referring again to FIG. 2, a variation of dissolver 200 is illustrated. The combination of impermeable plug 250 and porous screen 240 is replaced by impermeable disk 252 and spacers 254, respectively. Preferably, disk 252 and spacers 254 are made integral to each other. Spacers 254 allows aqueous fuel 110 and aqueous metal hydride fuel mixture 210' to flow through, and impermeable disk 252 prevents the ends of solid fuel 210 from being dissolved or eroded.

Furthermore, valve 220, 260 in this embodiment, is a diaphragm valve comprising diaphragm 222 and valve body 224. When assembled, diaphragm 222 is sandwiched between valve body 224 and end cap 225. When diaphragm 222 bows toward valve body 224, the valve is opened and aqueous component 110 flows through channel 223 of valve body 224 and through spacers 254. When diaphragm 222 is pressed against end cap 225 the diaphragm seals against the end cap to shut the valve.

Also, flow restrictor 226 in this embodiment is a set screw which is threadedly engaged with channel 223 of valve body 224. When set screw 226 is set or positioned close to diaphragm 222, the set screw limits the movement of diaphragm 222 to limit the rate of flow. When set screw 226 retreats, it allows diaphragm 222 to bow more to increase the rate of flow.

Figure 3:
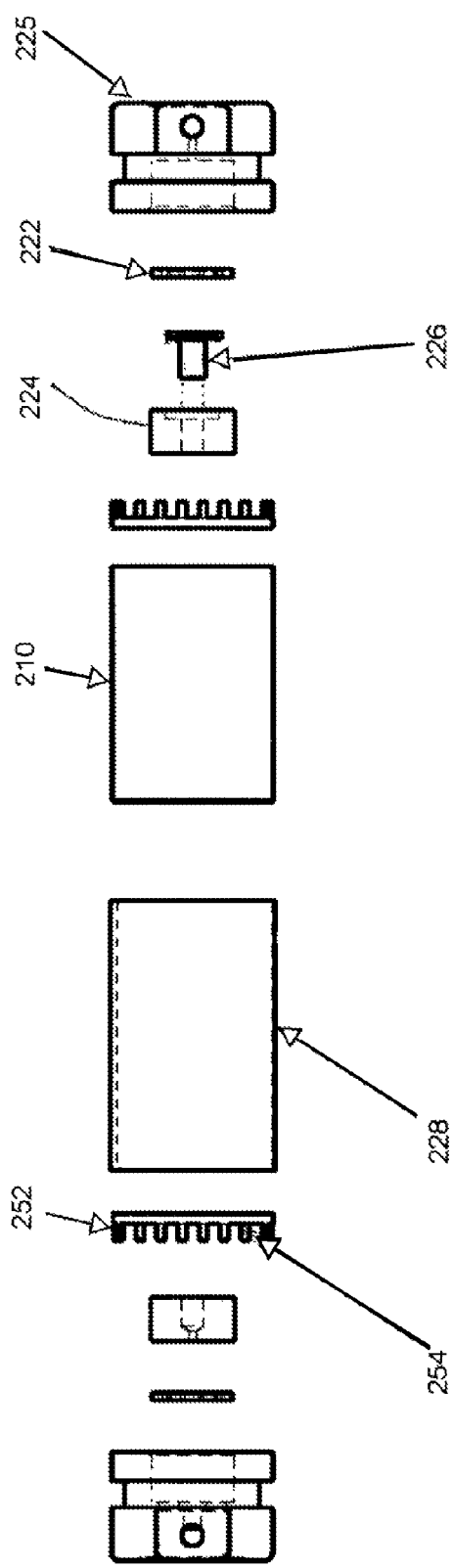
FIG. 3 is an exploded view of another inventive dissolver.

Another flow restrictor is illustrated in FIG. 3. Here, flow restrictor 226 is a plug with an enlarged head that is press-fitted into valve body 224 defining a flow channel therebetween. The flow channel is preferably small and is sized and dimensioned to restrict the flow of liquid therethrough. Flow regulators such as those disclosed in international patent application no. PCT/US2008/073865 are usable herein to control the flow of aqueous fuel 110 through dissolver 200. This international patent application is incorporated by reference herein in its entirety.

A second fluid transfer valve 260 controls the transfer of liquid metal hydride fuel component 210' from the fuel compartment 300 to the aerogel catalyst 310. Fluid transfer valve 260 is comparable to fluid transfer valve 220, but does not necessarily comprise a restrictor, and it opens and closes in a manner converse to valve 220. Alternately, flow restrictor 226 can be used with valve 260, instead of valve 220, or a flow restrictor can be used with both valves. More particularly, as the pressure within bladder 230 reaches threshold $P_T$, valve 260 gradually opens to allow aqueous metal hydride fuel mixture 210' to flow to aerogel catalyst 310.

It is desirable to maintain the concentration of dissolved metal hydride in aqueous metal hydride fuel mixture to be substantially constant, and preferably at about 15%-30%, preferably about 20% metal hydride. A significantly higher concentration may be too "rich" and may not have enough water to react in a stoichiometrically efficient manner. A significantly lower concentration may be too "lean" and may not have sufficient metal hydride to react. About 0.5% by weight of the water is NaOH stabilizer. The various embodiments of dissolver 200 were tested and their results are as follows:

| Dissolver 200 | # Run | Run Time | Reactor 310* | $H_2$ Flow Rate | Solid Fuel |
|---|---|---|---|---|---|
| FIG. 1 | 3 | 1.5 hr-2.0 hr | 0.08 g | 24 ml/min | 60% SBH + 40% KBH 0.625 inch diameter |
| FIG. 1 + paper screen 228 | 1 | >3.0 hrs | | 24 ml/min | 60% SBH + 40% KBH 0.625 inch diameter |
| FIG. 1 + paper screen 228 | 1 | 4.25 hrs | | 24 ml/min | 60% SBH + 40% KBH 0.75 inch diameter |
| FIG. 2 without flow restrictor | 1 | 4.45 hrs | | 26.5 ml/min | 60% SBH + 40% KBH 0.75 inch diameter |
| FIG. 2 with flow restrictor | 2 | 4 hrs-5.75 hrs | 0.05 g | 26.5 ml/min | (7 g) 5 parts SBH 2 parts KBH 0.75 inch diameter |
| FIG. 2 with flow restrictor | 3 | 8 hrs, 7.5 hrs, 7.5 hrs | 0.08 g | 26.5 ml/min | 5.5 parts SBH + 1.5 parts KBH (specific gravity 1.08) 0.75 inch diameter. |

*Reactor 310: 0.25 g $CoCl_2$, 0.15 g $RuCl_3$ and 0.5 g of aerogel = 0.8 g, which is subdivided into smaller samples used in the experiments.

Suitable metal hydride fuels include, but are not limited to, hydrides of elements of Groups IA-IVA of the Periodic Table of the Elements and mixtures thereof, such as alkaline or alkali metal hydrides, or mixtures thereof. Other compounds, such as alkali metal-aluminum hydrides (alanates) and alkali metal borohydrides may also be employed. More specific examples of metal hydrides include, but are not limited to, lithium hydride, lithium aluminum hydride, lithium borohydride, sodium hydride, sodium borohydride, potassium hydride, potassium borohydride, magnesium hydride, magnesium borohydride, calcium hydride, and salts and/or derivatives thereof. The preferred hydrides are sodium hydride, sodium borohydride, magnesium borohydride, lithium borohydride, and potassium borohydride.

In a preferred embodiment, the solid metal hydride fuel tablet 210 comprises a mixture of $NaBH_4$ and $KBH_4$, wherein the ratio of $NaBH_4$:$KBH_4$ is preferably about 5:2 or 5.5:1.5 (11:3). This ratio can be as low as 6:4, as shown in the Table above, or 1:1, and can be as high as 5:1. Such a ratio is advantageous, because it promotes the solubility and flowability of both the borohydride fuel and its borate byproducts. More particularly, although solid $NaBH_4$ is very soluble in water, when it participates in the hydride-water oxidation reaction, it forms hydrogen gas as well as a pasty slurry of borate. Conversely, although $KBH_4$ forms a slurry in water, when it participates in the hydride-water oxidation reaction, its aqueous borate byproduct does not form a slurry but is relatively soluble. Thus, given the potential disadvantages of using $NaBH_4$ or $KBH_4$ alone, it has been discovered that the mixture of $NaBH_4$ and $KBH_4$ produces a synergistic combination that yields both soluble borohydride fuel and soluble borate byproducts.

As mentioned above, the solid metal hydride fuel component 210 dissolves in aqueous component 110 to form aqueous metal hydride fuel mixture 210'. However, because the aqueous component 110 preferably contains a stabilizer such as NaOH, the aqueous metal hydride fuel mixture 210' does not significantly participate in the hydride-water oxidation reaction until it encounters the aerogel catalyst 310.

As discussed in greater detail above, aerogel catalyst 310 generates hydrogen gas and borate byproducts that flow into a liner 320. The liner 320 is fabricated from a gas-permeable, liquid impermeable membrane. The membrane can prevent liquids or byproducts from being transferred to the fuel cell (not shown) via hydrogen valve 360 and fuel conduit (also not shown). Fillers or foam 380 can optionally be used in combination with membrane to retain certain liquids or oxidation reaction byproducts and to reduce clogging. The membrane may be formed from any liquid impermeable, gas permeable material known to those skilled in the art. Such materials can include, but are not limited to, hydrophobic materials having an alkane group. More specific examples include, but are not limited to: polyethylene compositions, polytetrafluoroethylene, polypropylene, polyglactin (e.g., commercially available under the tradename VICRYL®), lyophilized dural mater, those (co)polymers sold under the tradenames CELGARD® and/or GORE-TEX®, those gas permeable, liquid impermeable materials disclosed in commonly owned U.S. Pat. No. 7,147,955 (which is incorporated by reference herein in its entirety), or copolymers or combinations thereof.

A screen can be placed on the outside of liner 320 to minimize the chance that it may seal against the side wall 370 of reaction chamber 300. This screen can also be attached to the inside of side wall 370. Another screen can also be placed on the inside of liner 320 to minimize the chance that liner 320 can seal to itself. These screens can be meshes or other porous devices, such as foam, a woven or a nonwoven, fibers, fibrils, etc.

When hydrogen gas is needed by the fuel cell, hydrogen valve 360 is opened. Hydrogen valve 360 can be any valve known in the art including, but not limited to, solenoid valve, check valve, poppet valve, diaphragm valve (similar to valves 220 and 260), etc., and can be opened manually by the user or by the controller controlling the fuel cell or the electronic device. A screen or filter 380 may also be placed in at the bottom of reaction chamber 300 to retain any liquid therein.

In an alternate embodiment, hydrogen- or gas-generating apparatus 10 can be housed in a single or unitary device comprising two side-by-side cylinders containing a reservoir 100 and reaction chamber 300. Dissolver 200, comprising solid borohydride fuel component 210, is positioned on one end of the unitary device. Hydrogen-generating apparatus 20 can also comprise a push to start mechanism that can control the generation of hydrogen gas.

In accordance to another aspect of the present invention, the thermodynamics and thermal mass of hydrogen-generating apparatus 10 are balanced to assure that the reaction between the metal hydride and the liquid component is self-sustaining and efficient. Self-sustaining reaction is necessary to supply steady hydrogen fuel to the fuel cell or another hydrogen consumer. High efficiency is necessary to maintaining a high energy density for apparatus 10.

Generally, hydrogen flow rates of about 30 ml (gas)/min to about 60 ml/min for about 6 to about 10 hours are desirable to supply hydrogen fuel to a fuel cell for consumer electronic devices, such as personal digital assistants (PDAs), smart phones, mobile phones, laptops, computer game devices and consoles. Any hydrogen flow rate is achievable with the present invention, and these flow rates are discussed for the purpose of illustration only In the discussion below, sodium borohydride is used for illustration purpose only. The present invention can be applied to any fuel capable of releasing hydrogen, including the metal hydride fuels or fuel mixtures described above. The stoichiometric equation describing the reaction of sodium borohydride and water is as follows:

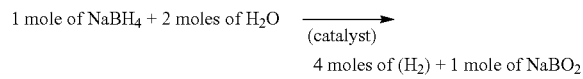

1 mole of $NaBH_4$ + 2 moles of $H_2O$ $\xrightarrow{\text{(catalyst)}}$ 4 moles of $(H_2)$ + 1 mole of $NaBO_2$ This equation can be converted to a mass balance equation, so that for one gram of $NaBH_4$ an ideal amount of hydrogen fuel can be obtained, as follows:

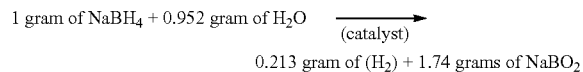

1 gram of $NaBH_4$ + 0.952 gram of $H_2O$ $\xrightarrow{\text{(catalyst)}}$ 0.213 gram of $(H_2)$ + 1.74 grams of $NaBO_2$ The stoichiometric-to-mass conversation can be obtained by looking up the mass of each mole of the compounds in the stoichiometric equation and normalizing to 1 gram of sodium borohydride. The total mass on the left hand side of the equation should be the same as the total mass of the right hand side of the equation, as required by the conservation of mass principle. This is certainly true for the above mass balance equation, save for rounding uncertainty. It can also be seen that the ideal weight (or mass) ratio of solid sodium borohydride to water is 1:0.952 or close to 1:1. The stoichiometric equations were previously disclosed in WO 2006/135,895, previously incorporated by reference.

Assuming that hydrogen acts similar to an ideal gas, 0.213 grams or 0.106 moles of hydrogen produces about 2.56 liters of hydrogen gas at standard temperature and pressure (STP), as shown below:

$PV = nRT$ where
  P is the absolute pressure of the gas, (101.33 kPa)
  V is the volume of the gas, in liters
  n is the number of moles of gas,
  R is the universal gas constant, (8.314472 kPa·L·mol$^{-1}$·K$^{-1}$)
  T is the absolute temperature, (295.65 K).

Hence, reacting 1 gram of $NaBH_4$ and almost 1 gram of $H_2O$ would provide 2.56 liters of hydrogen stoichiometrically. Assuming that this reaction can occur in one (1) minute, it can be scaled down to hydrogen gas flow rates of 30 ml/min and 60 ml/min, the expected stoichiometric aqueous hydride fuel flow rate is as follows:

(2.56l)*(1000ml/l)/(30ml)=85.5 scale factor (for 30ml/min flow rate of hydrogen)

(2.56l)*(1000ml/l)/(60ml)=42.7 scale factor (for 60ml/min flow rate of hydrogen)

The mass flow rates for sodium borohydride and water in one (1) minute are as follows:

1 gram of $NaBH_4$/scale factor = 11.7 mg/min
  (for 30 ml/min flow rate of hydrogen)
  = 23.4 mg/min
  (for 60 ml/min flow rate of hydrogen)

0.952 gram of $H_2O$/scale factor = 11.1 mg/min
  (for 30 ml/min flow rate of hydrogen)
  = 22.2 mg/min
  (for 60 ml/min flow rate of hydrogen)

The mass flow rates can be converted to volumetric flow rate using the density of these components. The density of water at STP is about 1 g/ml or 1000 mg/ml, and the density of $NaBH_4$ is about 1.11 g/cm$^3$ or about 1110 mg/ml.

| Target $H_2$ flow rate | $NaBH_4$ Mass flow rate | $H_2O$ Mass flow rate | $NaBH_4$ Volumetric flow rate | $H_2O$ Volumetric flow rate |
|---|---|---|---|---|
| 30 ml/min | 11.7 mg/min | 11.1 mg/min | 10.9 μl/min | 11.1 μl/min |
| 60 ml/min | 23.4 mg/min | 22.2 mg/min | 21.8 μl/min | 22.2 μl/min |

However, sodium borohydride does not react with water in a stoichiometric manner due to the chelation of water molecules to the borate byproducts, as discussed above, when water reacts with solid hydride. The inventors of the present invention have determined that suitable concentration of metal hydride, preferably sodium borohydride in water, i.e., aqueous metal hydride fuel mixture 201', to be between about 20% and about 25% and as high as about 30% of metal hydride by weight, with proper catalyst loading discussed below. The volumetric flow rates of aqueous metal hydride 201' at these concentrations can be calculated as follows:

Volumetric flow rate at 20%: $NaBH_4$ flow rate+(80%/20%) $H_2O$ flow rate

Volumetric flow rate at 30%: $NaBH_4$ flow rate+(70%/30%) $H_2O$ flow rate

The volumetric flow rate for $NaBH_4$ is kept the same since this amount is needed to produce hydrogen at the stoichiometric level, and the volumetric rate for $H_2O$ is increased proportionally to reflect that more water is needed for the reaction. The combined volumetric flow rates are shown below.

| Target $H_2$ flow rate | $NaBH_4$ Volumetric flow rate | $H_2O$ Volumetric flow rate | Combined flow rate at 20% metal hydride | Combined flow rate at 30% metal hydride |
|---|---|---|---|---|
| 30 ml/min | 10.9 μl/min | 11.1 μl/min | 57.7 μl/min | 49.9 μl/min |
| 60 ml/min | 21.8 μl/min | 22.2 μl/min | 115.4 μl/min | 99.8 μl/min |

Once the flow rate of aqueous metal hydride fuel mixture 201' for the target hydrogen flow rate or production rate is determined, the loading of aerogel catalyst 310 can be ascertained. Although the flow rates are used in the discussion above, the flow rate of aqueous metal hydride is very slow, i.e., in the order of micro-liters per minute. This flow rate is akin the amount of aqueous metal hydride contacting the catalyst. Also, although the following discussion involves aerogel catalysts, this technology is applicable to catalyst disposed on any substrate, e.g. flat or curved substrates or foam substrates such as nickel foam. Catalyst loading, which is the amount of catalyst available to catalyze the reaction, is one of the factors that can control the thermodynamics of the reaction. If the catalyst loading is too high or if too much catalyst is used, then the rate of this exothermic reaction would be too fast. This would drive the temperature reaction chamber high and can cause the borate byproducts to precipitate from the aqueous byproduct solution. The precipitated borate can block or plug the pores in the aerogel and reduces the amount of catalyst available to catalyze. With less available catalyst, the reaction would slow and the hydrogen flow rate may become insufficient to feed the fuel cell to power electronic devices. This blockage can also occur when catalysts are posited on foam substrates, such as nickel foam. On the other hand, if the catalyst loading is too low or not enough catalyst is used, the rate of reaction is low and significant amount of aqueous metal hydride fuel mixture 201' would remain un-reacted thereby flooding the reaction chamber, and the efficiency of the reaction chamber would decrease.

The inventors of the present invention have discovered that for aqueous metal hydride fuel mixture 201' having about 20% of $NaBH_4$ concentration with about 0.5% of NaOH stabilizing agent with a catalyst loading of about 0.02 g to about 0.03 g of $CoCl_2$ and $RuCl_3$ catalyst, which may react with the borate byproduct to form a cobalt boron (CoB) catalyst in situ, loaded on to an aerogel substrate having the same weight. The rate of fuel conversion to hydrogen exceeds about 98% for a hydrogen gas flow rate of up to 100 ml/min and an aqueous metal hydride fuel mixture flow rate of up to 0.12 ml/min.

For aqueous metal hydride fuel mixture 201' having about 30% of $NaBH_4$ concentration with about 0.5% of NaOH stabilizing agent with a catalyst loading of about 0.007 g to about 0.01 g of $CoCl_2$ and $RuCl_3$ catalyst, which may react with the borate byproduct to form a cobalt boron (CoB) catalyst in situ, loaded on to an aerogel substrate having the same weight. The rate of fuel conversion to hydrogen exceeds about 98% for a hydrogen gas flow rate of up to 100 ml/min and an aqueous metal hydride fuel mixture flow rate of up to 0.12 ml/min.

Another factor is the balance of the thermal mass of the stream of aqueous hydride fuel mixture 201' entering, the stream of hydrogen gas leaving, the byproducts remaining in reaction chamber 300, and aerogel catalyst 310. Thermal mass is the ability to store heat when the environmental heat is high and to release the stored heat when the environmental heat is low. Thermal mass can also work in reverse, i.e., gives up heat when the environmental heat is low (storing coolness) and absorb heat when the environmental heat is high. Generally, a high thermal mass material would have high specific heat, high density and low thermal conductivity (good insulation). Specific heat is the measure of the heat energy required to increase the temperature of a unit quantity of a substance by a certain temperature interval. For example, specific heat is the amount of heat to raise 1 gram of the substance 1° C. High density is helpful because there would be more mass per unit volume. Low thermal conductivity is preferred, because the stored heat is less likely to be dissipated or transferred to another body before being used.

The thermal mass of the aerogel catalyst should be sufficiently small, so that its temperature can be raised relatively quickly by the exothermic reaction between metal hydride and water. The inventors believe that hotter catalysts are more efficient. The thermal mass of aqueous metal hydride fuel mixture 201' and the borate byproducts, which are mostly water, are sufficient to absorb the heat from the exothermic reaction between metal hydride and water to prevent the temperature of reaction chamber 300 from exceeding the level where the unwanted precipitation of borate occurs, so long as the flow rate of aqueous metal hydride fuel mixture 201' is kept to the rates discussed above and/or the catalyst loading is kept to the amount discussed above. The materials used to construct reaction chamber 300, i.e., may have high thermal mass to store the generated heat or may have high thermal conductivity to dissipate the generated heat. Fins or other thermal conductors can be used to carry away the generated heat.

The methodology controlling the precipitation of borate or the hydration of reaction chamber 300 so is discussed below. Ideally, when these conditions occurred, the temperature of reaction chamber 300 is at about 45° C. or less and the pressure is about 1 psi or more. At these conditions, water evaporation to steam is minimized so that aerogel catalyst 310 and/or reaction chamber 300 are sufficiently hydrated to minimize or prevent the precipitation of borate byproducts. The temperature of reaction chamber 300 can also be less than about 40° C. and can be less than 35° C.

The energy of a system is described and controlled by the First Law of Thermodynamics, which is also known as the principle of conservation of energy. The Law can be stated as follows: the increase in the internal energy of a system is equal to the amount of energy added by heating the system, minus the amount lost as a result of the work done by the system on its surroundings, or $$\Delta U = Q - W$$

where, $\Delta U$ is the change in the internal energy

Q is the amount of energy added by heating the system and

W is the amount of work done by the system on its surrounding.

Internal energy ($\Delta U$) is defined as the energy associated with the random, disordered motion of molecules at the atomic and molecular levels. It is unrelated to the macroscopic ordered energy associated with moving objects. For example, a room temperature glass of water sitting on a table has no apparent energy, either potential or kinetic. But on the microscopic scale, water molecules are traveling at hundreds of meters per second. If the glass of water were moved, this microscopic energy would not necessarily be changed. For the purpose of the present invention, the internal energy can be thought of as being directly related to the temperature of the system.

Since, no work (W) is done by reaction chamber 300 on the surrounding, i.e., it does not act or does not perform work on another body or component, work can be eliminated from the equation. The amount of energy added by heat (Q) is the amount of heat released by the exothermic reaction between metal hydride and water, discussed above, which are carried into reaction chamber 300 as aqueous metal hydride fuel mixture 201'. Additionally, some of the generated heat is absorbed in the thermal mass of entering aqueous metal hydride fuel mixture 201', which becomes the borate byproducts, and a smaller amount is carried out by the thermal mass of exiting hydrogen gas to the fuel cell. Some of the generated heat is absorbed by the endothermic vaporization of water into steam. Some of the generated heat is transferred to the atmosphere by heat conduction, convention and radiation.

The energy added to the system by the exothermic reaction is equaled to $$Q = Q1 - Q2 + Q3$$

where, $Q1$ = temperature change of reaction chamber 300 =

$(cm(t)\Delta T_1)$ where $c$ is the specific heat of reaction chamber 300 $m(t)$ is the mass of reaction chamber 300, which increases as more aqueous metal hydride fuel mixture 201' is added thereto, and hence the flow rate can affect $m(t)$ $\Delta T_1$ is the change or rise in temperature of reaction chamber 300 which is equaled to $T(\text{system } 300) - T(\text{at startup})$ $Q2$ = heat transferred out of reaction chamber 300 heat transferred by conduction, convection and radiation + heat of hydrogen (heat convection and heat radiation can be ignored to simplify the illustration; heat carried out of the system by hydrogen can also be ignored due to the low mass and specific heat of hydrogen) =

$(kA\Delta T_2 t/d)$, where $k$ is the thermal conductivity of walls reaction chamber 300, and metal walls should be used due to higher $k$ when heat should be carried away to maintain a low temperature $A$ is the surface area of reaction chamber 300 $t$ is the time period of the heat transfer $d$ is the thickness of the walls $\Delta T_2$ is the difference between the temperature of reaction chamber 300 and ambient temperature (which is equaled to $T(\text{system } 300) - T(\text{ambient})$)

$Q3$ = heat used by the vaporization of water = $m_v L_v$, where $m_v$ is the mass of water undergoing the phase change to steam $L_v$ is the heat of vaporization of water, which is about 100 cal/gram or 418 kJ/kg between 0° C. and 100° C..

Hence, the internal energy of reaction chamber 300 can be approximated as follows:

$$\Delta U = Q$$

$$\Delta U = (cm(t)\Delta T_1) - (kA\Delta T_2 t/d) + (m_v L_v)$$

$$\Delta U = (cm(t)(T_{300} - T_{(startup)})) - (kA(T_{300} - T_{(ambient)})t/d) + (m_v L_v)$$

The temperature at startup is the substantially same as the ambient temperature and can be presumed to be the same, i.e., $T_{(startup)} \sim T_{(ambient)}$. Hence, it is desirable to maintain the temperature of reaction chamber 300 ($T_{300}$) at a temperature where the mass of vaporized water ($m_v$) is minimal to keep the borate byproduct hydrated and to minimize precipitation.

The inventors of the present invention have determined that by controlling m(t), (or the flow rate of aqueous metal hydride fuel mixture 201'), the rate of reaction (i.e., catalyst loading), the thermal conductivity and surface area of the walls of reaction chamber 300, the temperature of reaction chamber 300 can be controlled to minimize $m_v$, the vaporization of water.

In accordance with another aspect of the present invention, the thermal balance or the balance of thermal mass is conducted only around aerogel catalyst 310, as discussed above. The thermal mass of aerogel 310 is kept sufficiently small (see the examples above), so that its temperature can be raised relatively quickly by the exothermic reaction between metal hydride and water. The inventors believe that hotter catalysts are more efficient. The thermal mass of aqueous metal hydride fuel mixture 201' and the borate byproducts, which are mostly water, are sufficient to absorb the heat from the exothermic reaction between metal hydride and water to prevent the temperature of reaction chamber 300 from exceeding the level where the unwanted precipitation of borate occurs, so long as the flow rate of aqueous metal hydride fuel mixture 201' is kept to the rates discussed above and/or the catalyst loading is kept to the amount discussed above.

Empirically, for the system shown in FIGS. 1-3, when the temperature of reaction chamber 300 is at or below about 45° C. and at pressure of about 0.103 bar (1.5 psi) or higher, is minimized so that sufficient water remains in liquid form to form chelating relationship with borate to minimize borate precipitation.

Figure 4:
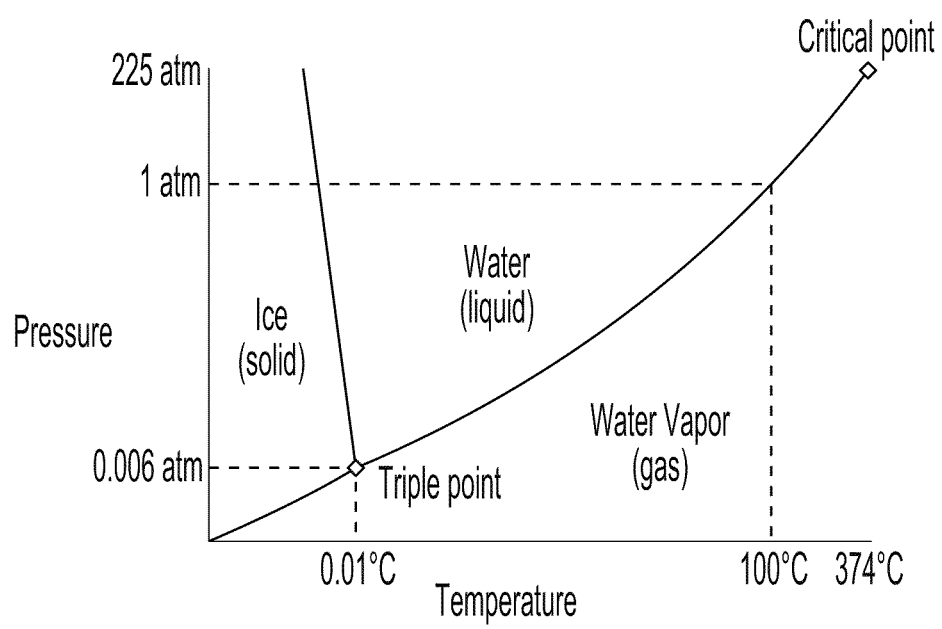
FIG. 4 is a temperature-pressure diagram showing the three phases of water.

The steam or water vapor inside reaction chamber 300 is saturated steam, i.e., steam that is in equilibrium with liquid water. For saturated steam, its temperature is closely related to its pressure, e.g., saturated steam table. Thus, if temperature is known, pressure can be determined readily. When temperature is 45° C. (113° F.), the pressure of the saturated steam is 0.0959 bar (1.391 psi). When temperature is 46° C. (114.8° F.), the pressure of the saturated steam is 0.1010 bar (1.464 psi). On the other hand, when pressure is 0.0689 bar (1 psi) the temperature of saturated steam is 38.72° C. (101.7° F.). Hence, in accordance with another aspect of the present invention, another control that can be employed is to deviate the steam within reaction chamber 300 from the saturated state. In other words, when temperature is known the pressure should be kept higher than the saturated pressure to discourage liquid water from evaporating. Vice versa, when pressure is known, the temperature should be kept lower than the saturated temperature to discourage liquid water from evaporating. Visually, the temperature and pressure of water should be above the demarcation line between liquid water and water vapor on the water temperature-pressure diagram (T-P curve). In other words, the temperature and pressure of water in reactor chamber 300 should be in the liquid region of the water T-P diagram. An exemplary T-P curve is reproduced herein as FIG. 4. T-P curve for water is well known to one of ordinary skill in the art.

Preferably, the pressure inside reaction chamber 300 should be more than about 0.0689 bar (1 psi) above the saturation pressure of water at its current temperature, more preferably more than about 0.138 bar (2 psi) above and even more preferably more than about 0.207 bar (3 psi) above. Alternatively, the temperature inside reaction chamber 300 should be more than about 1° C. below the saturation temperature of water at this current pressure, more preferably more than about 2° C. below and even more preferably more than about 3° C. below.

The pressure of reaction chamber 300 can be controlled by valve 360, shown in FIG. 1. Valve 360 can have a set threshold pressure requiring the pressure within reaction chamber 300 to exceed the threshold pressure to open. This threshold pressure can be pre-determined depending on the construction of the reaction chamber to exceed the saturated pressure of water at the operating temperature range. For example, if the operating temperature range is less than about 45° C., the threshold pressure should be greater than 1.391 psi, preferably 1 psi, more preferably 2 psi and even more preferably more than 3 psi higher than the 1.391 psi saturation pressure. Suitable valves can be any of the ones listed above, e.g., solenoid valves, poppet valves, diaphragm valves, check valves, etc.

Alternatively, the temperature of reaction chamber can be controlled by the flow rate of aqueous metal hydride fuel mixture 201', the catalyst loading, the reaction rate, the factors that control the internal energy or ΔU of reaction chamber 300 discussed above, and the heat transfer properties of the materials used to construct reaction chamber 300. Temperature can also be controlled by cooling mechanism, heat fins and heat sinks.

Controlling the pressure of reaction chamber 300 is less cumbersome than controlling temperature to control the evaporation of water into steam, and is, therefore, the preferred methodology. However, both methodologies can be used.

Figure 5:
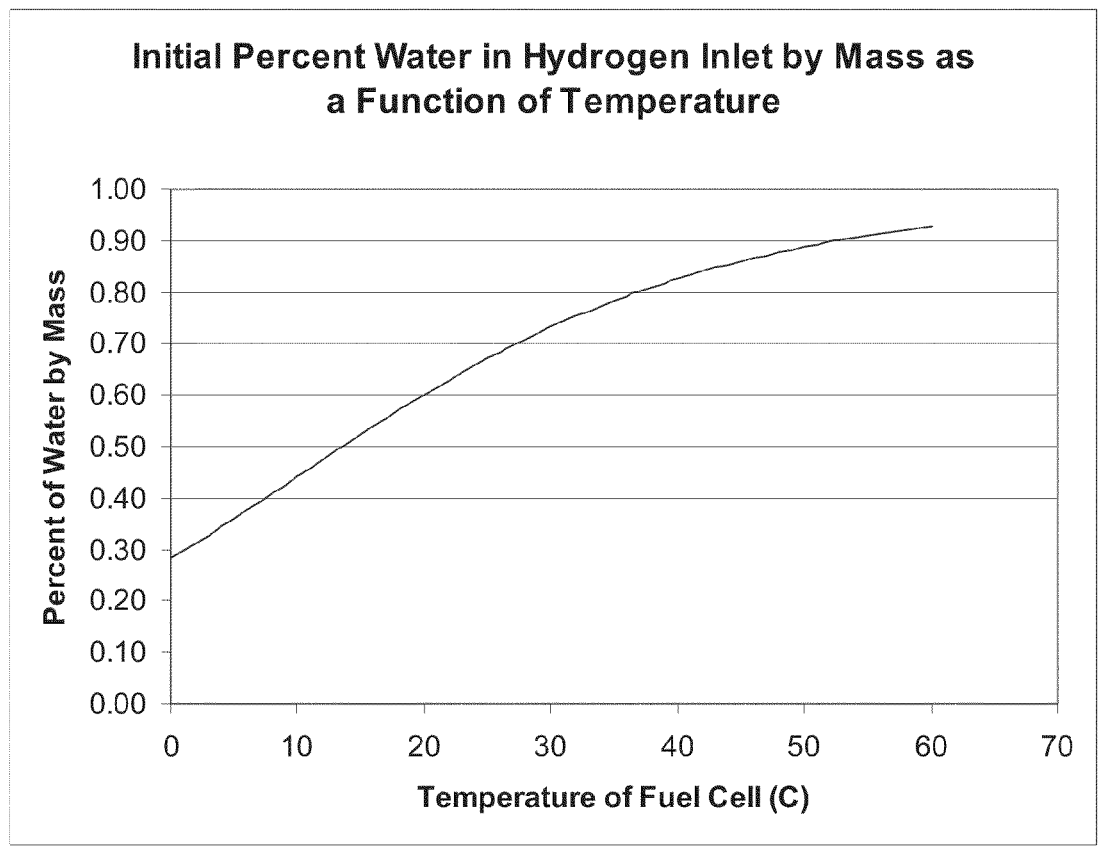
FIG. 5 is a diagram depicting hydration as a function of temperature.

In accordance with another aspect of the present invention, the amount of water vapor in the hydrogen gas is controlled by controlling the pressure and/or the pressure of the reaction chamber. In other words, some water evaporation is desirable and the temperature and pressure values in the reaction chamber are on or below the T-P curve for solution within the reaction chamber. In one example, at start-up a PEM fuel cell needs a higher amount of water vapor or hydration in the hydrogen fuel or X ratio, and after the system reaches steady state and water by product is produced the amount of water vapor in the hydrogen fuel needs to be reduced. Furthermore, the amount of water vapor, X, required is a function of operating temperature, as shown in FIG. 5. Fuel cell hydration is discussed in published patent applications US 2001/0028970, US 2006/0263654 and US 2005/0227125, which are incorporated herein by reference in their entireties.

According to another aspect of the present invention, a CPU or controller associated with the fuel cell can be used to control valve 360, which preferably is a variable valve such as a solenoid valve or other electrical valves. Depending on the operating temperature of the fuel cell and the amount of water byproduct produced by the fuel cell, the CPU can control valve 360 to control the pressure (when temperature is known) in the reaction chamber to control the amount of water vapor in the fuel gas. This control is dynamic depending on the need of the fuel cell.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

We claim:

1. A method for controlling a reaction between an aqueous metal hydride fuel and a catalyst to produce hydrogen comprising the steps of:

i. setting a target hydrogen production rate;
   ii. determining a catalyst loading to produce the target hydrogen production rate, wherein the catalyst loading comprises an amount of the catalyst sufficient to react at least an amount of the aqueous metal hydride fuel,
   iii. locating the catalyst and the aqueous metal hydride fuel in a reaction chamber; and
   iv. maintaining a temperature and a pressure in the reaction chamber by setting a threshold pressure for a valve fluidly connecting the reaction chamber to a fuel cell to open.

2. The method of claim 1 further comprising the step of determining a concentration of metal hydride in water.

3. The method of claim 1 further comprising the step of balancing between a higher amount of catalyst, which raises the reaction rate and a temperature of the reaction which can precipitate a byproduct from solution and a lower amount of catalyst, which slows the reaction rate and leaves an amount of fuel unreacted.

4. The method of claim 2, wherein when the concentration of metal hydride is higher the catalyst loading comprises relatively less catalyst.

5. The method of claim 1 further comprising the step of minimizing a thermal mass of the catalyst.

6. The method of claim 1, wherein a temperature of the reaction is maintained to be less than about 45° C.

7. The method of claim 1, wherein a pressure within a chamber containing the reaction is greater than about 1 psi.

8. The method of claim 1 further comprising the step of determining a flow rate of the aqueous metal hydride fuel contacting the catalyst to produce the target hydrogen production rate.

9. The method of claim 1, wherein the pressure in the reaction chamber is at least about 1 psi above a saturation pressure of water at a current temperature of the reaction chamber.

10. The method of claim 1, wherein the pressure in the reaction chamber is at least about 2 psi above a saturation pressure of water at a current temperature of the reaction chamber.

11. The method of claim 1, wherein the pressure in the reaction chamber is at least about 3 psi above a saturation pressure of water at a current temperature of the reaction chamber.

12. The method of claim 1, wherein the temperature in the reaction chamber is at least about 1° C. below a saturation temperature of water at a current pressure of the reaction chamber.

13. The method of claim 1, wherein the temperature in the reaction chamber is at least about 2° C. below a saturation temperature of water at a current pressure of the reaction chamber.

14. The method of claim 1, wherein the temperature in the reaction chamber is at least about 3° C. below a saturation temperature of water at a current pressure of the reaction chamber.

15. The method of claim 1, wherein the valve is controlled by a controller.

16. The method of claim 1, wherein the valve comprises at east one of a poppet valve, a diaphragm valve or a check valve.

17. The method of claim 1, wherein the temperature and pressure in the reaction chamber are maintained within the liquid phase of a water temperature-pressure diagram.

* * * * *